July 21, 1942. R. C. HART 2,290,428
ORNAMENTAL ARTICLE OF MANUFACTURE
Filed Dec. 12, 1940
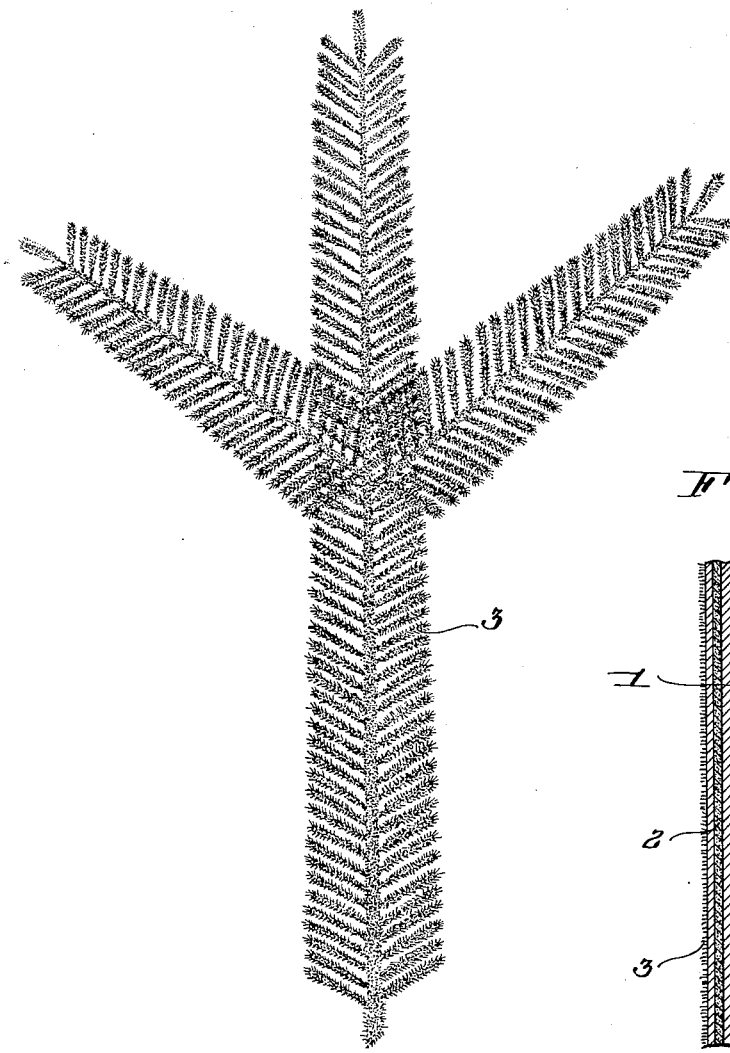
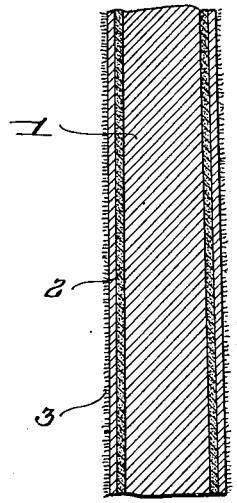
INVENTOR.
Richard C. Hart
BY Harold E. Stonebraker
his Attorney Patented July 21, 1942

2,290,428

UNITED STATES PATENT OFFICE 2,290,428

ORNAMENTAL ARTICLE OF MANUFACTURE

Richard C. Hart, Fairport, N. Y., assignor to Geo. B. Hart, Inc., Rochester, N. Y., a corporation of New York Application December 12, 1940, Serial No. 369,857

1 Claim. (Cl. 41—36)

This invention relates to an ornamental article of manufacture, and has for its object to provide a structure consisting of a base or support comprising any natural growth or foliage, such as a leaf or branch of a tree or plant, a flower, flower bud, seed pod, gourd, or fruit, treated in such a manner as to encase it with a feathery-like outer covering of any desired color.

Heretofore, where foliage or natural growth has been treated to obtain an artificial effect, this has been accomplished by the mere application of a dye, color, or paint, the leaf or growth retaining its original structure and appearance except for a change in color, and it is an object of this invention to cover the leaf or natural base with a decorative material that gives a feathery-like appearance or effect, while at the same time obtaining any desired color.

Another object of the invention is to afford a medium for ornamentally covering the leaf or natural growth so that it is substantially sealed, preserving the natural base and increasing the utility of the product for a longer period of time than where it is only colored or dyed.

In a more specific aspect the invention consists in utilizing a natural growth such as a leaf or branch which is first coated or completely encased in a suitable adhesive such as flock adhesive, clear varnish or lacquer, and then applying to the adhesive coating before it is dried a covering of flock, or other short-fibred material of any desirable or selected color, the flock and adhesive combining to seal the leaf, branch or other natural growth and to prevent the leaves or needles from drying and falling off, as is the case where they are merely dyed, colored or painted, resulting in a comparatively quick and complete drying out of the natural growth.

To these and other ends, the invention consists in the construction that will appear clearly from the following description when read in conjunction with the accompanying drawing, the novel features being pointed out in the claim following the specification.

In the drawing:

Fig. 1 is a plan view of one practical embodiment of the invention as applied to a branch of a balsam fir tree, and Fig. 2 is an enlarged longitudinal sectional view of one of the individual needles broken away at the ends.

Referring to Fig. 2, 1 designates the natural growth or base which in the illustrated embodiment consists of the wood or fibrous needle of the branch, 2 designates a coating of suitable adhesive material, and 3 designates the outer covering of flock or other feathery-appearing or short-fibred material.

The invention is applicable to any natural growth, such as leaves or branches of trees or plants, for example, spruce, pine, cedar, balsam, hemlock, fern fronds, palm leaves, coontia, ivy, philodendron, statice, lycopodium, or asparagus, or any flowers or flower buds, seed pods, gourds, or fruit, or other natural growths which it is desired to use for ornamental or decorative purposes in place of the conventional dyed or painted foliage.

In the first instance, the leaf, branch, or other natural base is completely covered with an adhesive that is sprayed or otherwise applied over the entire surface of the natural growth. In the case of a leaf, the adhesive is sprayed first on one side and then on the other, and where the natural growth has a multiplicity of surfaces such as a branch of spruce, the adhesive material is sprayed on while rotating the branch, first outwardly and then inwardly with relation to the direction of growth of the needles.

Any suitable slow drying adhesive may be used, such as conventional flock adhesive, clear varnish, or clear lacquer, the adhesive being preferably of a character that will dry in about ten minutes, depending upon the amount of drier it contains. The adhesive material, which may be of a waterproof or non-waterproof character, is preferably applied by a spray gun, and coloring material may be added to the adhesive if required to cover the surface of the base more completely.

Immediately after the adhesive material has been applied, the ornamental covering material consisting of flock or other short-fibred material is placed over the adhesive coating. The flock or other ornamental covering, by closely adhering to and combining with the adhesive, serves as a complete casing which entirely covers the natural base and adhesive, and gives an exterior ornamental and decorative effect characterized by a feathery appearance of any desired color, depending upon the color of the flock, or the color and nature of the material that is used.

While it is possible to use various powdered or other ornamenting material such as ground mica or pyrites, I have obtained the best and most effective results with short-fibred rayon material known commercially as flock. The flock or other ornamental material is preferably applied by means of an air gun, in such a way as to cover all surfaces or sides of the natural growth or support, and to encase completely the adhesive coating and form a bond therewith.

In this fashion, the flock and adhesive material completely seal the natural growth, green, or foliage, preserving it to a marked degree, and acting to prevent it from shedding or withering for a longer period of time than has heretofore been possible where such products have been colored by dyes or paints.

The flock, being of a selected color and entirely covering the leaf, branch, or other natural growth, affords a feathery appearance, while retaining the general lines and conformation of the branch, leaf, or natural growth, thus producing a decidedly attractive and highly ornamental effect which is substantially different from and more desirable than any of the artificial effects that have heretofore been attempted in connection with natural foliage.

While the invention has been described in connection with a particular embodiment, it is not confined to the precise disclosure set forth, and this application is intended to cover such modifications or departures as may come within the purposes of the improvement and the scope of the following claim.

I claim:

An ornamental article of manufacture comprising a natural growth such as a pine, spruce, or other evergreen branch, produced by applying a seal of adhesive material in direct contact with and completely encasing every part of the branch and needles while green and containing their natural moisture, and an outer ornamental covering of short fibered material such as flock completely covering all portions of the branch, the adhesive material and ornamental covering acting to retain the natural moisture within the branch.

RICHARD C. HART.